United States Patent
Sandin (10) Patent No.: US 9,234,547 B2
(45) Date of Patent: Jan. 12, 2016

(54) SPLIT BEARING AND METHOD OF MAKING THE SAME

(75) Inventor: Kenneth D. Sandin, Yakima, WA (US)

(73) Assignee: Moxee Innovations Corporation, Moxee, WA (US)

( * ) Notice: Subject to any disclaimer, the term of this patent is extended or adjusted under 35 U.S.C. 154(b) by 1243 days.

(21) Appl. No.: 13/053,056

(22) Filed: Mar. 21, 2011

(65) Prior Publication Data

US 2011/0170815 A1    Jul. 14, 2011

Related U.S. Application Data

(62) Division of application No. 11/752,217, filed on May 22, 2007, now Pat. No. 7,930,827.

(60) Provisional application No. 60/828,355, filed on Oct. 5, 2006, provisional application No. 60/802,901, filed on May 23, 2006, provisional application No. 60/802,611, filed on May 22, 2006.

(51) Int. Cl.
| | |
|---|---|
| *F16C 23/04* | (2006.01) |
| *F16C 35/02* | (2006.01) |
| *B65G 49/06* | (2006.01) |

(52) U.S. Cl.
CPC .............. *F16C 35/02* (2013.01); *B65G 49/063* (2013.01); *F16C 23/046* (2013.01); *B65G 2249/02* (2013.01); *Y10T 29/49636* (2015.01); *Y10T 29/49664* (2015.01); *Y10T 29/49694* (2015.01); *Y10T 29/49712* (2015.01); *Y10T 29/49861* (2015.01); *Y10T 29/49893* (2015.01); *Y10T 29/49895* (2015.01)

(58) Field of Classification Search
CPC . F16C 35/02; F16C 23/046; Y10T 29/49664; Y10T 29/49893; Y10T 29/49895; Y10T 29/49636; B65G 49/063
USPC ............. 29/898, 463, 464, 898.052, 898.069, 29/898.13, 899, 899.1, 525.11, 558, 445, 29/466; 72/363; 384/208, 211, 212
See application file for complete search history.

(56) References Cited

U.S. PATENT DOCUMENTS

| | | | |
|---|---|---|---|
| 1,327,925 A * | 1/1920 | Schneider | ..................... 474/154 |
| 2,113,060 A | 4/1938 | Sandberg | |
| 2,410,002 A | 10/1946 | Bach | |
| 2,445,268 A | 7/1948 | Hodgins | |
| 2,506,477 A | 5/1950 | Warren | |
| 2,560,413 A | 7/1951 | Carlson | |
| 2,963,772 A | 12/1960 | Niles | |
| 3,514,839 A | 6/1970 | Rodrigues | |
| 3,587,154 A | 6/1971 | Potter | |
| 3,772,750 A | 11/1973 | Hauser | |
| 4,091,572 A | 5/1978 | Denning | |
| 4,596,406 A | 6/1986 | Van Vleet | |
| 4,885,835 A | 12/1989 | Osgood | |

(Continued)

*Primary Examiner* — Ryan J Walters
(74) *Attorney, Agent, or Firm* — Christensen O'Connor Johnson Kindness PLLC (57) ABSTRACT

A split bearing generally includes first and second bearing halves each having complementary partial shaft receiving portions, wherein the first and second bearing halves are substantially identically configured. The split bearing further includes means for releasably coupling the first and second bearing halves together, such that when coupled, the complementary partial shaft receiving portions of the first and second bearing halves define a center bearing thru-hole for receiving a shaft, and when decoupled, the first and second bearing halves can be removed from the shaft.

18 Claims, 7 Drawing Sheets

(56) References Cited

U.S. PATENT DOCUMENTS

| | | |
|---|---|---|
| 4,993,739 A | 2/1991 | Putnam |
| 5,199,864 A * | 4/1993 | Stecklein ..................... 418/68 |
| 5,659,956 A | 8/1997 | Braginsky |
| 6,116,632 A | 9/2000 | Belinky |
| 6,241,271 B1 | 6/2001 | Belinky |
| 7,930,827 B2 | 4/2011 | Sandin |

* cited by examiner

SPLIT BEARING AND METHOD OF MAKING THE SAME

CROSS-REFERENCE(S) TO RELATED APPLICATIONS

This application is a division of U.S. patent application Ser. No. 11/752,217, filed May 22, 2007, which claims the benefit of U.S. Provisional Patent Applications Nos. 60/828,355, filed Oct. 5, 2006; 60/802,901, filed May 23, 2006; and 60/802,611, filed May 22, 2006, the disclosures of which are hereby expressly incorporated by reference.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one embodiment of the present disclosure, a split bearing is provided. The split bearing includes first and second bearing halves each having complementary partial shaft receiving portions, wherein the first and second bearing halves are substantially identically configured. The split bearing further includes means for releasably coupling the first and second bearing halves together, such that when coupled, the complementary partial shaft receiving portions of the first and second bearing halves define a center bearing thru-hole for receiving a shaft, and when decoupled, the first and second bearing halves can be removed from the shaft.

In accordance with another embodiment of the present disclosure, a spherical split bearing is provided. The spherical split bearing includes first and second bearing halves each having complementary partial shaft receiving portions. The spherical split bearing further includes means for releasably coupling the first and second bearing halves together, such that when coupled, the complementary partial shaft receiving portions of the first and second bearing halves define a center bearing thru-hole for receiving a shaft, and when decoupled, the first and second bearing halves can be removed from the shaft.

In accordance with yet another embodiment of the present disclosure, a method of making a spherical split bearing is provided. The method includes obtaining first and second blocks, removably coupling the first block to the second block to form a combination block, boring a center thru-hole through the combination block, and forming the combination block into a substantially spherical shape.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
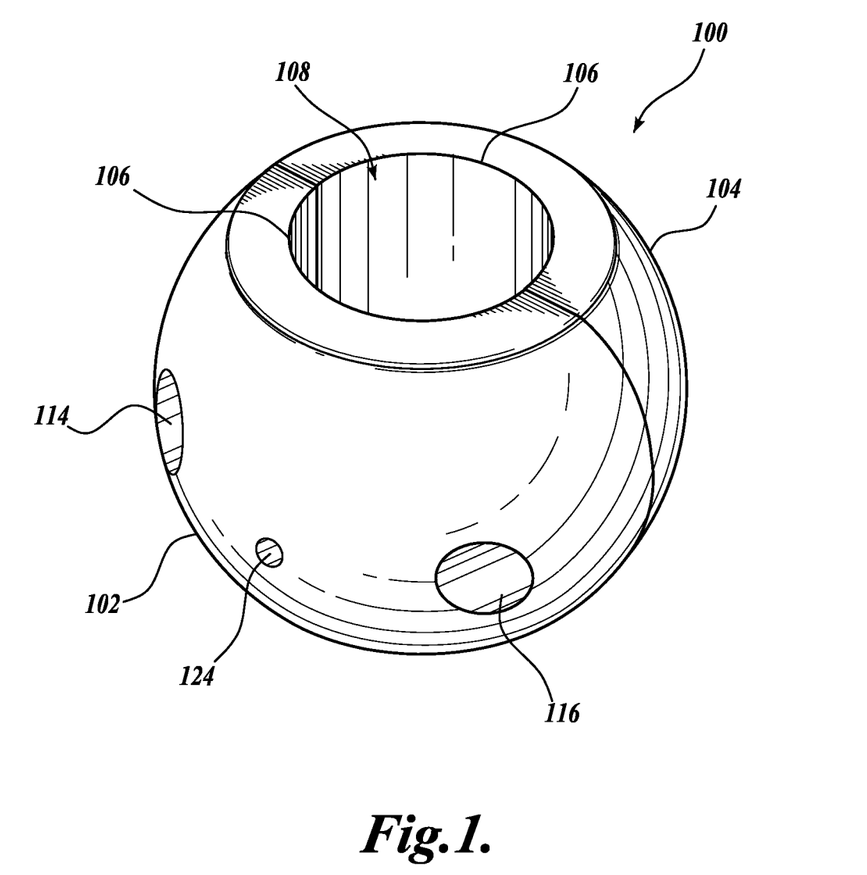
FIG. 1 is a perspective view of a split bearing formed in accordance with various aspects of the present disclosure.
Figure 2:
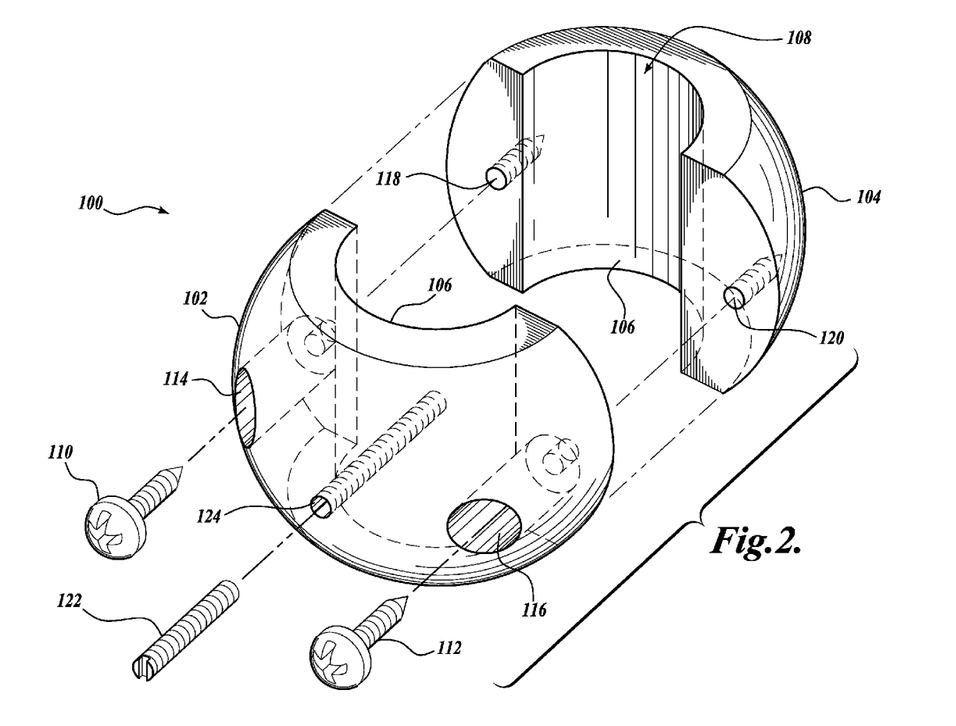
FIG. 2 is an exploded view of the bearing of FIG. 1.

A split bearing 100 constructed in accordance with one embodiment of the present disclosure may be best understood by referring to FIGS. 1 and 2. As best seen in FIG. 2, the bearing 100 includes first and second bearing halves 102 and 104. The bearing halves 102 and 104 are substantially identically configured and are designed to be complimentarily coupled to one another. In that regard, the bearing 100 includes means for releasably coupling the first and second bearing halves 102 and 104 together, shown as coupling device 106 and 108 in the illustrated embodiment.

As used in this context, the term "substantially identically configured" is intended to mean components that are geometrically shaped to be nearly identical minor images and include dimensional and geometric differences within ordinary and reasonable acceptable engineering tolerances. Although it is preferred that the first and second halves 102 and 104 are substantially identically configured, it should be apparent that other geometries, such as asymmetrical halves, are also within the scope of the present disclosure.

A bearing 100 designed and configured in accordance with embodiments of the present disclosure is designed to be selectively splittable (i.e., separated into first and second halves 102 and 104) by a user. In this regard, the bearing 100 provides for ease of installation or replacement, for example, on a shaft S (see, e.g., FIGS. 3 and 4) that may include a plurality of bearings, may be capped at its ends or otherwise engaged at other points along its length, or positioned in a housing, such as a pillow block.

Figure 3:
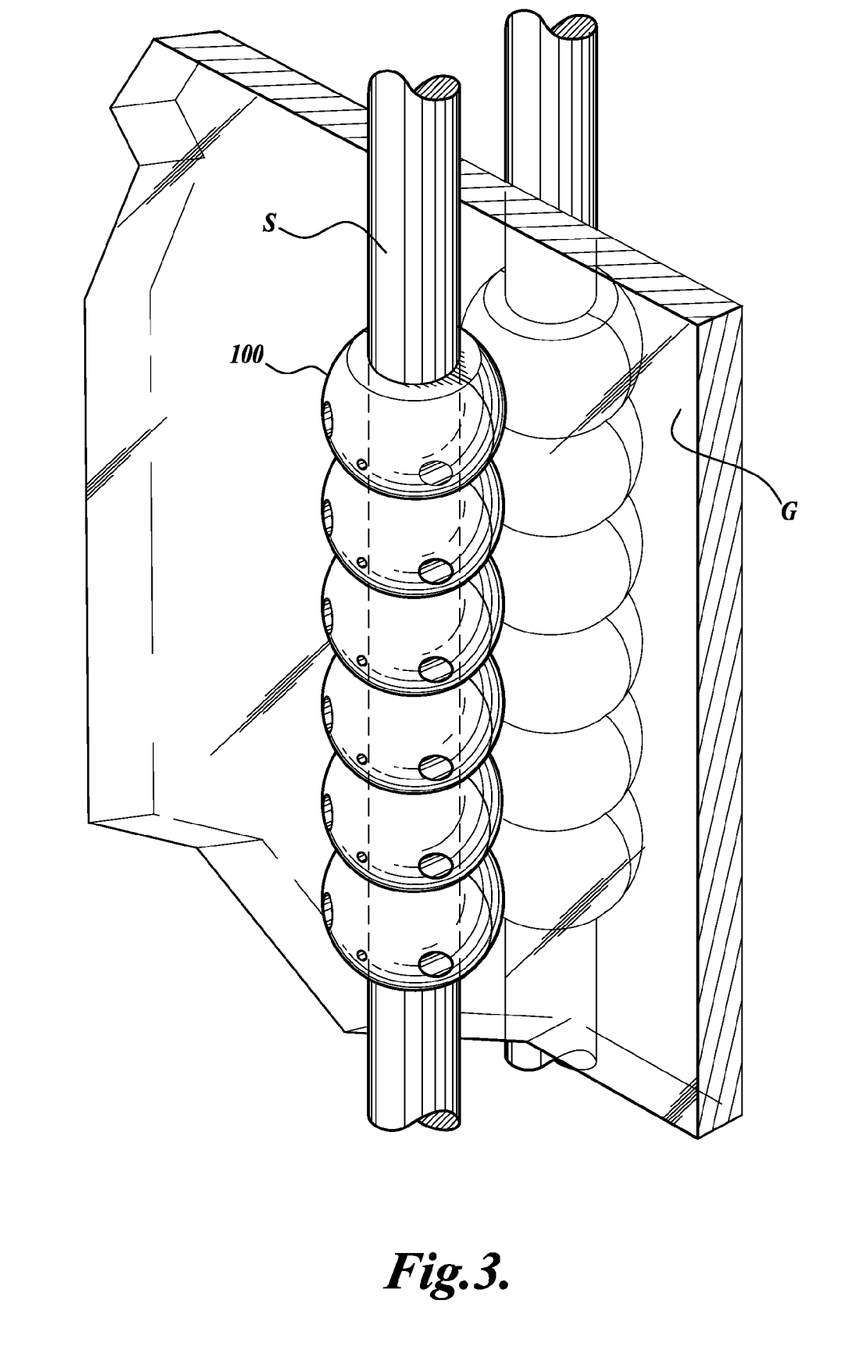
FIG. 3 is a perspective view of a plurality of split bearings of FIG. 1 received on a shaft in an exemplary glass coating application.

Referring to FIG. 3, a non-limiting example of a bearing 100 on a shaft S in a glass coating application is shown, in which sheets of glass are to be coated in a spray booth or dip chamber. In accordance with the coating process, the sheets of glass are placed in a standing orientation, vertically between shafts S, for transportation along a conveyor (not shown). A plurality of bearings 100 are used to provide a cushion for shock tolerance between the sheet of glass G and the shafts S as the glass G travels on the conveyor. As described in greater detail below, the bearings 100 may be configured to rotate or roll together with the shaft S relative to the sheet of glass G, or independently of the shaft S. It should be appreciated that the plurality of bearings 100 may be spaced from one another with spacers (not shown), for example, spacers received on the shaft or protrusions from the shaft itself, for spacing therebetween on a shaft S.

Figure 4:
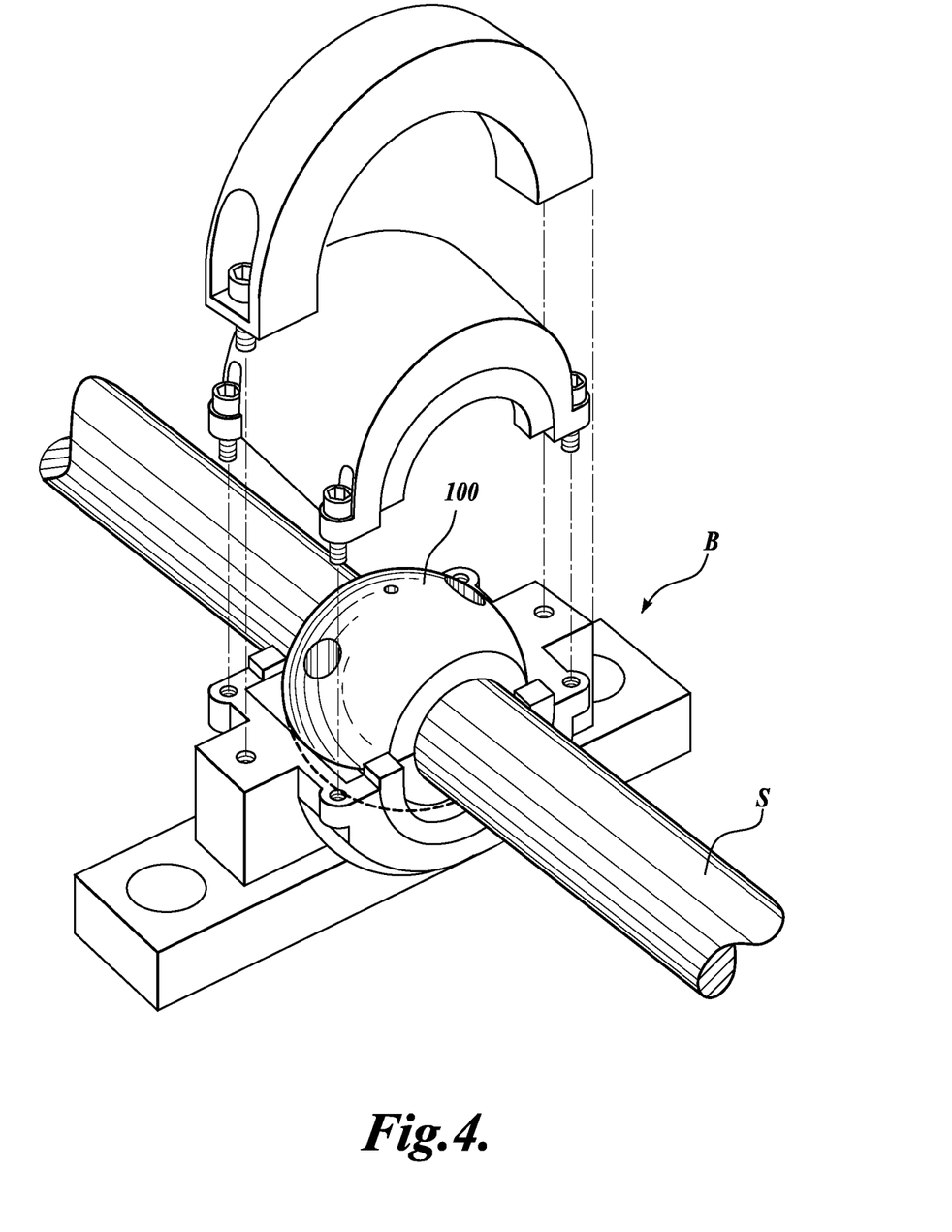
FIG. 4 is an exploded view of a split bearing of FIG. 1 received on a shaft in an exemplary pillow block application.

Referring to FIG. 4, as another non-limiting example, a bearing 100 designed and configured in accordance with embodiments of the present disclosure can be used as an internal component in a pillow block application. In that regard, the top portion of the pillow block B can removed from the base portion, and the split bearing 100 can be installed or replaced around the shaft S without requiring removal of the shaft S from the base portion of the pillow block B or of any drive components installed on the shaft S. As described in greater detail below, the bearing 100 may be configured to rotate or roll together with the shaft S relative to the pillow block B, or to remain stationary with the pillow block B.

As may be best seen by referring to FIGS. 1 and 2, the bearing 100 of the illustrated embodiment has a spherical design, and the first and second halves 102 and 104 have complementary partial shaft receiving portions 106. In that regard, the first and second halves 102 and 104 are substantially C-shaped, such that each half includes a centrally-located arcuate section 106 (see FIG. 2). When the first and second bearing halves 102 and 104 are coupled to one another, the arcuate sections 106 define a center thru-hole 108 in the bearing 100.

It should be appreciated that while the first and second halves 102 and 104 are substantially C-shaped in the illustrated embodiment to accommodate a shaft having a substantially circular cross-section, other inner designs are within the scope of the present disclosure depending on the cross-sectional shape of the shaft. For example, if the shaft is substantially square or rectangular in cross-sectional shape, the first and second halves may be substantially V-shaped, having a centrally located cornered section, instead of an arcuate section. Further, although the illustrated embodiment is configured in a spherical shape, it should be appreciated that other non-spherical split bearing designs are also within the scope of the present disclosure, including, but not limited to, cylindrical and polyhedra three-dimensional designs. The shape of the bearing depends on the application for which it is designed.

The means for releasably coupling the first and second bearing halves 102 and 104 may include, but is not limited to, coupling devices, such as screws, bolts, rivets, pins, clamps, clips, snap-fit devices, dual-lock reclosable fasteners, hook and loop fasteners, slidingly engagable interfaces between the first and second halves 102 and 104, and other means for releasably coupling with one another. It should be appreciated that the strength required for a suitable coupling device may depend on the specific application that the bearing 100 is to be used in. For example, in low stress application, a hook and loop fastener may be a suitable releasable coupling device; however, in higher stress applications, a hook and loop fastener may not adequately maintain its coupling bond, and bolts or screws may be a preferred means for releasably coupling the first and second bearing halves 102 and 104.

In the illustrated embodiment of FIGS. 1 and 2, the coupling device includes first and second screw fasteners 110 and 112. The first half 102 further includes first and second bores 114 and 116 for receiving the first and second fasteners 110 and 112. In the illustrated embodiment, the bores 114 and 116 are countersunk to form an interior shoulder within each of the bores for maintaining the fastener head flush with or below the outer surface of the bearing 100.

The first and second fasteners 110 and 112 are sized and configured to be received within the second bearing half 104, for example, within correspondingly located and configured retention holes 118 and 120 in the second half 104 (see FIG. 2). It should be appreciated that suitably threaded retention holes 118 and 120 may be formed in the second half 104 for cooperating with threaded fasteners 110 and 112, such as screws, to simplify assembly.

To attach the bearing 100 to a shaft S (see, e.g., FIGS. 3 and 4), the fasteners 110 and 112 are removed, such that the first and second halves 102 and 104 separate from one another, as best seen in the exploded view of the bearing 100 in FIG. 2. Thereafter, the first and second halves 102 and 104 can be placed around the diameter of the shaft S such that the shaft S is disposed within the center thru-hole 108 defined by the arcuate sections 106 of the first and second halves 102 and 104.

Figure 5:
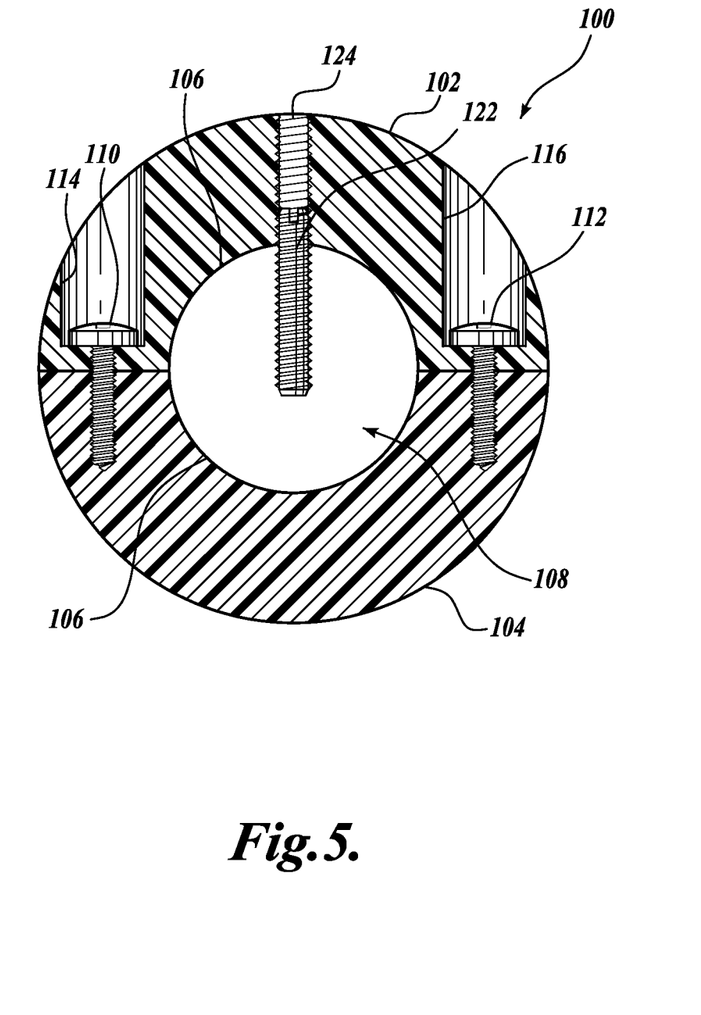
FIG. 5 is a side, cross-sectional view of the bearing of FIG. 1.

As may be best seen by referring to FIGS. 2 and 5, the bearing 100 may optionally include an attachment device 122 for releasably securing the bearing 100 in a specific position along the shaft S or in a specific orientation relative to a surrounding housing, for example, the pillow block B of FIG. 4. In one embodiment, the attachment device 122 is configured as a pin, such as a roll pin or a threaded pin. The pin 122 is suitably received, such as threadably received (see FIGS. 2 and 5), within a third bore 124 in the first half 102. The pin 122 can be used, for example, to engage a hole or a groove (not shown) in the shaft S to secure the bearing 100 in a specific position along the length of the shaft S (see FIG. 3). If the pin 122 is received in a hole in the shaft S, the bearing 100 will rotate (or remain fixed) together with the shaft S. If the pin 122 is received in a groove in the shaft S, the bearing 100 will rotate independently of the rotation of the shaft S, but will maintain a specific position along the length of the shaft S. To remove the bearing 100 from the shaft S, the pin 122 is removed from the third bore 124 and the bearing 100 is split into first and second halves 102 and 104 by disengagement of the means for releasably coupling the halves.

Alternatively, the pin 122 may be configured to engage a hole (not shown) in the interior portion of the pillow block B in the illustrated embodiment of FIG. 4 to secure the bearing 100 in a specific position in the pillow block B. If the pin 122 is received in a hole in the interior portion of the pillow block B, the bearing 100 will not rotate with the shaft S, but will remain stationary with the pillow block B. As described similarly above with respect to the shaft S, to remove the bearing 100 from the pillow block B, the pin 122 is removed from the third bore 124 and the bearing 100 is split into first and second halves 102 and 104 by disengagement of the means for releasably coupling the halves.

It should be appreciated, however, that other securement means besides pins may be used in conjunction with bearings of the present disclosure. As a non-limiting example, the bearing 100 may have an interference fit with the shaft or the pillow block to secure the bearing 100 on the shaft or in the pillow block.

Bearings 100 designed in accordance with embodiments described herein may be formed from any suitable materials or composites, including plastic or metal materials and composites, whether lubricated or self-lubricated. Suitable materials may have some or all of the following properties, such as high abrasion resistance, high impact strength, a low friction coefficient, chemical resistance, dielectric properties, and resistance to weather and aging. Suitable plastic materials include, but are not limited to, fluoropolymers, polyketones, polyimides, sulfone and sulfide polymers, and nylons. In one embodiment, the first and second bearing halves 102 and 104 are constructed from a high temperature material, such as a material capable of withstanding a temperature of at least about 400° F. High temperature materials that may be practiced with embodiments of the present disclosure include, as a non-limiting example, 400° F. polytetrafluoroethylene (i.e., PTFE, also known as Teflon®). When constructed of a high temperature material, the bearing 100 may be used in high temperature applications, such as protecting glass or other products from manufacturing damage, for example, in power transmission applications. Although constructing the first and second halves 102 and 104 from the same material is disclosed, it should be apparent that bearing halves constructed from different types of materials or composites are also within the scope of the present disclosure.

Figure 6:
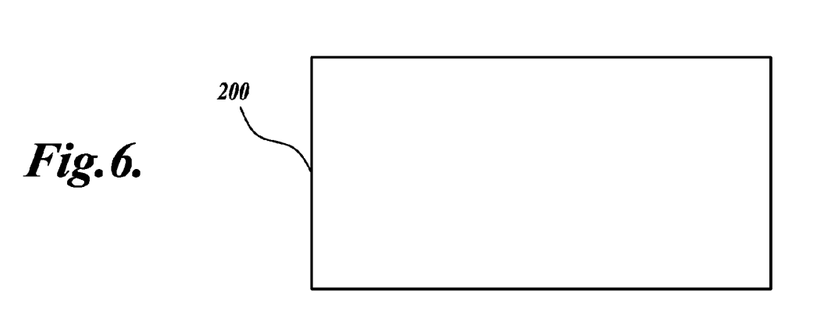
FIG. 6 is a side view of a first block of material used to manufacture the bearing of FIG. 1.
Figure 7:
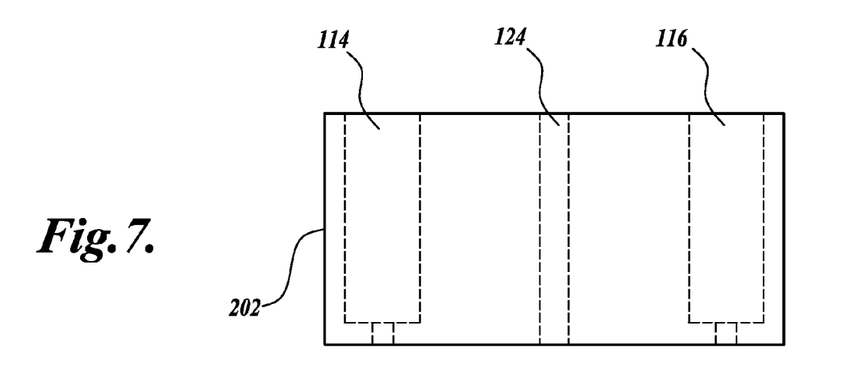
FIG. 7 is a side view of a second block of material used to manufacture the bearing of FIG. 1.

A method of manufacturing the bearing 100 may be best understood by referring to FIGS. 6-9. Referring to FIG. 6, bearing starting material, such as 400° F. polytetrafluoroethylene material, is cut into solid blocks 200. Referring to FIG. 7, one of the solid blocks 200 is drilled out to include first, second, and third bores 114, 116, and 124, all of which can be suitably configured and located to extend through the width of the solid block 200. In the illustrated embodiment, the first and second bores 114 and 116 are countersunk bores, each having an interior shoulder. As described above, the first and second bores 114 and 116 are suitably sized and configured to receive fasteners 110 and 112. The third bore 124 is suitably sized and configured to receive an attachment device 122, such as a pin. Therefore, the resulting block 200 is a out block 202 having a plurality of bores 114, 116, and 124.

Figure 8:
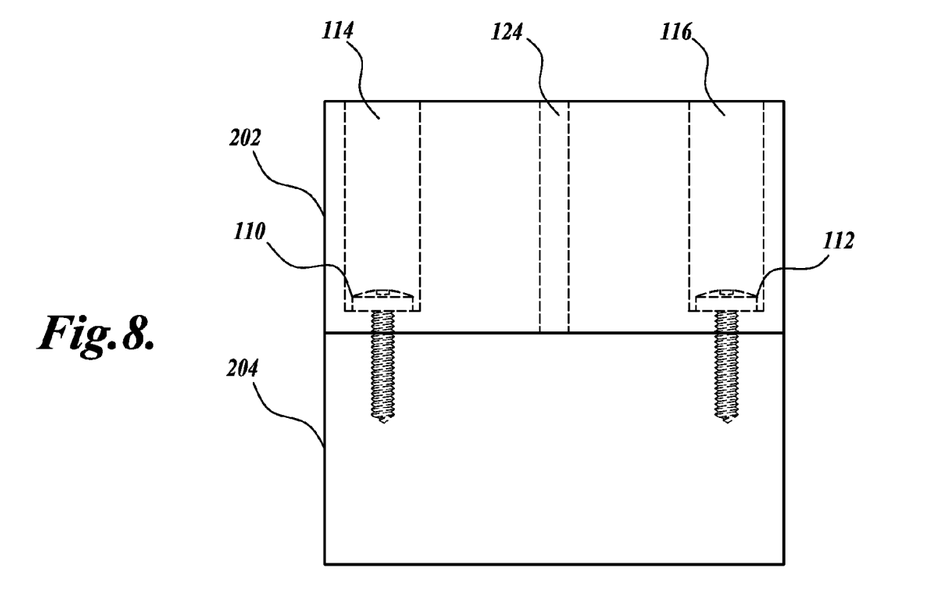
FIG. 8 is a side view of coupled first and second blocks of material of FIGS. 6 and 7.
Figure 9:
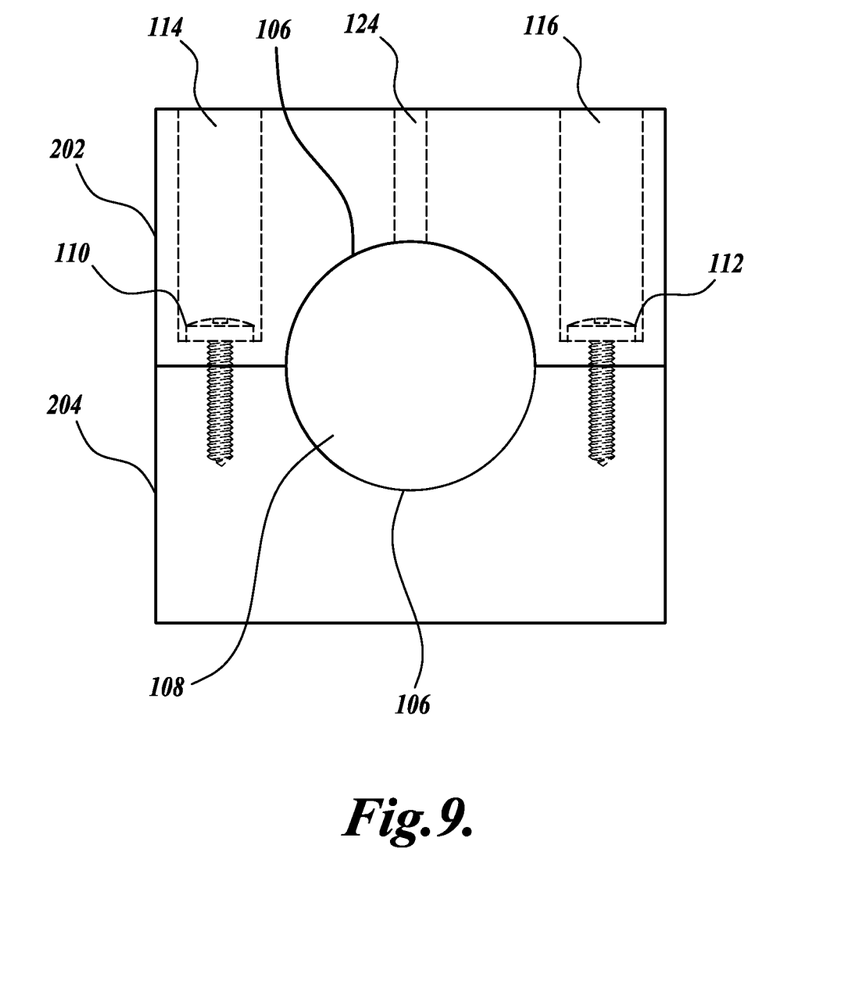
FIG. 9 is a side view of coupled first and second blocks of material of FIGS. 6 and 7, further including a center thru-hole.

As best seen in FIG. 8, the first drilled out block 202 is releasably coupled to a second undrilled block 204 by a coupling device, such as fasteners. As a non-limiting example, first and second fasteners 110 and 112 are positioned within the first and second bores 114 and 116, to rest at the shoulders of the bores 114 and 116, such that the fasteners 110 and 112 protrude from one end of the first drilled out block 202. The second undrilled block 204 is aligned and joined with the first drilled out block 202, such that the first and second fasteners 110 and 112 are coupled to (i.e., screwed into) the second undrilled block 204. Suitably threaded retention holes 118 and 120 (see FIG. 2) may be formed in the second block 204 for cooperating with fasteners 110 and 112 to simplify assembly.

After the two blocks 202 and 204 are aligned and joined together by the first and second fasteners 110 and 112, a center thru-hole 108 is bored through the first and second blocks 202 and 204. The center thru-hole 108 is suitably positioned between the first and second blocks 202 and 204, such that when the blocks 202 and 204 are disassembled from one another, each block includes a complementary partial shaft receiving portion, for example, an arcuate portion 106, which define the center thru-hole 108.

Now returning to FIG. 5, after the center thru-hole 108 has been bored through the coupled first and second blocks 202 and 204, the blocks 202 and 204 are formed and deburred, for example, by a lathe or other multi-dimensional forming device, into a desired shape (e.g., spherical, as seen in the illustrated embodiment of FIGS. 1 and 2) of a bearing 100 having first and second bearing halves 102 and 104 and a center thru-hole 108.

While illustrative embodiments have been illustrated and described, it will be appreciated that various changes can be made therein without departing from the spirit and scope of the invention.

The embodiments of the invention in which an exclusive property or privilege is claimed are defined as follows:

1. A split bearing configured to be received on a shaft having a length, the split bearing selectively split-able for installation or removal from the shaft without bearing travel along the length of the shaft, comprising:
    (a) first and second bearing halves each having complementary partial shaft receiving portions, wherein the first and second bearing halves are substantially identically configured;
    (b) at least first and second fasteners extending from the first bearing half and received within the second bearing half for releasably coupling the first and second bearing halves together, such that when coupled, the complementary partial shaft receiving portions of the first and second bearing halves define a center bearing thru-hole having a first end and a second end for receiving the shaft extending from the first end to the second end of the center bearing thru-hole, and when decoupled, the first and second bearing halves can be removed from the shaft; and
    (c) first and second countersunk bores in the first bearing half, each having an opening and an interior shoulder, the countersunk bores being sized and configured to accept the first and second fasteners, each having a head and a body such that the fasteners extend from the first bearing half and are received within the second bearing half, and when coupled, the fastener heads abut the shoulders in the first and second countersunk bores, the fastener heads do not extend beyond the openings in the first bearing half, and the fasteners are entirely embedded within the spherical split bearing.

2. The split bearing of claim 1, further comprising an attachment device for releasably securing the split bearing in a specific position along the shaft or within a housing.

3. The split bearing of claim 2, wherein the attachment device is a pin.

4. The split bearing of claim 1, wherein the second bearing half includes first and second retention holes for receiving the first and second fasteners extending from the first bearing half.

5. The split bearing of claim 1, wherein the split bearing is substantially spherical in shape.

6. The split bearing of claim 1, wherein the first and second bearing halves are substantially identically configured.

7. The split bearing of claim 1, wherein the complementary partial shaft receiving portions are arcuate portions, such that the center bearing thru-hole is circular.

8. The split bearing of claim 1, wherein the first and second bearing halves are made from a material capable of withstanding a temperature of at least 400 degrees Fahrenheit.

9. The split bearing of claim 1, wherein the first and second bearing halves are made from polytetrafluoroethylene.

10. A spherical split bearing configured to be received on a shaft having a length, the split bearing selectively split-able for installation or removal from the shaft without bearing travel along the length of the shaft, comprising:
    (a) first and second bearing halves each having complementary partial shaft receiving portions;
    (b) at least first and second fasteners extending from the first bearing half and received within the second bearing half for releasably coupling the first and second bearing halves together, such that when coupled, the complementary partial shaft receiving portions of the first and second bearing halves define a center bearing thru-hole having a first end and a second end for receiving the shaft extending from the first end to the second end of the center bearing thru-hole, and when decoupled, the first and second bearing halves can be removed from the shaft;
    (c) first and second countersunk bores in the first bearing half, each having an opening and an interior shoulder, the countersunk bores being sized and configured to accept the first and second fasteners, each having a head and a body such that the fasteners extend from the first bearing half and are received within the second bearing half, and when coupled, the fastener heads abut the shoulders in the first and second countersunk bores, the fastener heads do not extend beyond the openings in the first bearing half, and the fasteners are entirely embedded within the spherical split bearing; and (d) an attachment device for releasably securing the split bearing in a specific position along the shaft.

11. An assembly of a spherical split bearing and a shaft, the split bearing selectively split-able for installation or removal from the shaft without bearing travel along the length of the shaft, comprising:

(a) the shaft having a length and a circular cross-section normal to a longitudinal axis of the shaft;

(b) first and second bearing halves each having complementary partial shaft receiving portions, wherein the first bearing half includes first and second bores configured to receive fasteners, each having a head and a body such that the fasteners extend from the first bearing half and are received within the second bearing half, wherein the first and second bores are countersunk bores, each having an opening and an interior shoulder, the bores being sized and configured to each accept the fasteners; and (c) the fasteners releasably coupling the first and second bearing halves together by extending through the first and second bores of the first bearing half and being received in the second bearing half, wherein the fastener heads abut the shoulders in the first and second countersunk bores, the fastener heads do not extend beyond the openings in the first bearing half, and the fasteners are entirely embedded within the spherical split bearing;

wherein, when releasably coupled, the complementary partial shaft receiving portions of the first and second bearing halves define a center bearing thru-hole having a first end and a second end for receiving the shaft extending from the first end to the second end of the center bearing thru-hole, and when decoupled, the first and second bearing halves can be removed from the shaft.

12. The split bearing of claim 11, further comprising an attachment device for releasably securing the split bearing in a specific position along the shaft or within a housing.

13. The split bearing of claim 11, wherein the attachment device is a pin.

14. The split bearing of claim 11, wherein the second bearing half includes first and second retention holes for receiving the first and second fasteners extending from the first bearing half.

15. The split bearing of claim 11, wherein the first and second bearing halves are substantially identically configured.

16. The split bearing of claim 11, wherein the complementary partial shaft receiving portions are arcuate portions, such that the center bearing thru-hole is circular.

17. The split bearing of claim 11, wherein the first and second bearing halves are made from a material capable of withstanding a temperature of at least 400 degrees Fahrenheit.

18. The split bearing of claim 11, wherein the first and second bearing halves are made from polytetrafluoroethylene.

* * * * *